US012748264B2

(12) United States Patent
Nakajima et al.

(10) Patent No.: US 12,748,264 B2
(45) Date of Patent: Sep. 29, 2026

(54) CAPILLARY AND MANUFACTURING METHOD THEREFOR

(71) Applicant: NIPPON ELECTRIC GLASS CO., LTD., Shiga (JP)

(72) Inventors: Sotohiro Nakajima, Shiga (JP); Tomoaki Kawamura, Shiga (JP); Takumi Murakami, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 286 days.

(21) Appl. No.: 18/832,660

(22) PCT Filed: Jan. 26, 2023

(86) PCT No.: PCT/JP2023/002485
§ 371 (c)(1),
(2) Date: Jul. 24, 2024

(87) PCT Pub. No.: WO2023/145835
PCT Pub. Date: Aug. 3, 2023

(65) Prior Publication Data

US 2025/0110284 A1 Apr. 3, 2025

(30) Foreign Application Priority Data

Jan. 27, 2022 (JP) ................................ 2022-010925

(51) Int. Cl.
*G02B 6/36* (2006.01)
*C03C 25/6208* (2018.01)
(Continued)

(52) U.S. Cl.
CPC .......... *G02B 6/364* (2013.01); *C03C 25/6208* (2018.01); *G02B 6/3861* (2013.01); *G02B 6/4434* (2013.01)

(58) Field of Classification Search
CPC ........ G02B 6/36; G02B 6/364; G02B 6/3861; G02B 6/4434; C03C 23/007; C03C 23/0025; C03C 25/6208; C03C 27/10
See application file for complete search history.

(56) References Cited

U.S. PATENT DOCUMENTS

2002/0039472 A1 4/2002 Takeuti et al.
2006/0188213 A1* 8/2006 Griffin ................ G02B 6/3835 385/139
(Continued)

FOREIGN PATENT DOCUMENTS

JP 9-258064 10/1997
JP 2002-214478 7/2002
(Continued)

OTHER PUBLICATIONS

International Search Report mailed Apr. 4, 2023 in International Application No. PCT /JP2023/002485.
(Continued)

*Primary Examiner* — Michael P Mooney
(74) *Attorney, Agent, or Firm* — Wenderoth, Lind & Ponack, L.L.P.

(57) ABSTRACT

A capillary includes a capillary main body made of glass and formed in an elongated shape. The capillary main body includes an accommodating portion configured to accommodate a part of an optical fiber. The accommodating portion includes an opening portion, which is formed in a first end surface of the capillary main body and is configured to allow insertion of the optical fiber. The capillary main body includes a compressive stress layer, which is formed on an opening portion and is observable by a two-dimensional birefringence measurement method, a tensile stress layer, which is formed at a position away from the compressive stress layer toward a second end surface of the capillary main body and is observable by the two-dimensional bire-
(Continued)

fringence measurement method and a stress-neutral layer, which is formed between the compressive stress layer and the tensile stress layer and is observable by the two-dimensional birefringence measurement method.

20 Claims, 8 Drawing Sheets

(51) Int. Cl.

| | |
|---|---|
| ***G02B 6/38*** | (2006.01) |
| ***G02B 6/44*** | (2006.01) |

(56) References Cited

U.S. PATENT DOCUMENTS

| | | | | |
|---|---|---|---|---|
| 2012/0051082 | A1 * | 3/2012 | Hsu | C30B 29/20 362/553 |
| 2019/0250337 | A1 | 8/2019 | Logunov et al. | |

FOREIGN PATENT DOCUMENTS

| | | |
|---|---|---|
| JP | 2003-50337 | 2/2003 |
| JP | 2003-167161 | 6/2003 |
| WO | 2019/160918 | 8/2019 |

OTHER PUBLICATIONS

International Preliminary Report on Patentability and Written Opinion of the International Searching Authority issued Jul. 30, 2024 in International (PCT) Application No. PCT/JP2023/002485.

* cited by examiner

CAPILLARY AND MANUFACTURING METHOD THEREFOR

TECHNICAL FIELD

The present invention relates to a capillary for, for example, holding an optical fiber and a method of manufacturing the same.

BACKGROUND ART

Various types of optical devices such as an optical multiplexer/demultiplexer, an optical isolator, and an optical circulator are used in an optical communication system using an optical fiber. When an optical fiber is connected to the optical device described above, a capillary is mounted to an end portion of the optical fiber so as to enhance operability.

For example, in Patent Literature 1, there is disclosed a capillary formed of a capillary tube. An end portion of the capillary is formed in an outwardly expanding tapered (flared) shape so as to allow easy insertion of the optical fiber into an inner hole of the capillary (see the paragraph [0002] of Patent Literature 1).

The tapered shape of the capillary is formed by alternately repeating a first step and a second step a plurality of times (see claim 1 and the paragraphs [0017] to [0019] of Patent Literature 1). In the first step, after a micro-diameter inner hole of a glass tube is filled with liquid (for example, water) that does not corrode a glass tube material and does not react with a corrosive liquid for the glass tube material, only one end surface of the glass tube is immersed in a corrosive liquid (etching solution containing hydrofluoric acid) for a given period of time. In the second step, the inner hole of the glass tube is cleaned after the immersion into the corrosive liquid.

CITATION LIST

Patent Literature 1: JP 2003-167161 A

SUMMARY OF INVENTION

Technical Problem

The optical fiber is fixed to the capillary with an adhesive filling the inner hole of the capillary. In this case, the capillary has a problem in strength because a wall thickness of the end portion formed in a tapered shape is smaller than that of other portion. In addition, when the end portion has a microcrack, cracking originating from the microcrack may occur in the end portion as a result of expansion or shrinkage of the adhesive, which is caused by a temperature change in an environment where the optical device is used.

The present invention has been made in view of the circumstances described above, and has a technical object to prevent the occurrence of cracking in an end portion of a capillary.

Solution to Problem

According to the present invention, in order to solve the above-mentioned problems, there is provided a capillary for holding an optical fiber, the capillary comprising a capillary main body being made of glass and formed in an elongated shape, wherein the capillary main body comprises: an accommodating portion configured to accommodate a part of an optical fiber; a first end surface formed at one end portion of the capillary main body in a longitudinal direction (tube-length direction of a tube glass); and a second end surface formed at another end portion of the capillary main body in the longitudinal direction, wherein the accommodating portion comprises an opening portion, which is formed in the first end surface and is configured to allow insertion of the optical fiber, and wherein the capillary main body comprises: a compressive stress layer, which is formed on the opening portion and is observable by a two-dimensional birefringence measurement method; a tensile stress layer, which is formed at a position away from the compressive stress layer toward the second end surface and is observable by the two-dimensional birefringence measurement method; and a stress-neutral layer, which is formed between the compressive stress layer and the tensile stress layer and is observable by the two-dimensional birefringence measurement method.

With the configuration described above, a portion of the capillary main body, in which the compressive stress layer is formed, is reinforced by the presence of the compressive stress layer. Thus, the occurrence of chipping and cracking in the first end surface and the opening portion (hereinafter collectively referred to as "end portion") of the capillary main body can be prevented.

Further, a portion of the capillary main body, in which the tensile stress layer is formed, is formed at a position away from the compressive stress layer with the stress-neutral layer being formed therebetween. As a result, a maximum value of a tensile stress can be made as small as possible. Thus, the tensile stress layer is less liable to be affected by expansion and shrinkage of an adhesive used for the capillary main body or expansion and shrinkage of the capillary main body. Further, even when a micro-scratch is formed in the capillary main body at the time of processing the capillary main body, the capillary main body is less liable to be affected by the scratch. Thus, the occurrence of cracking originating from the portion in which the tensile stress layer is formed can be prevented. In addition, with the formation of the stress-neutral layer, the portion of the capillary main body, in which the tensile stress layer is formed, is located at a position away from the first end surface by a length of the stress-neutral layer. For the capillary, the first end surface has frequent external contact. Thus, when the tensile stress layer is formed at a position away from the first end surface, the occurrence of chipping or cracking in the end portion of the capillary main body can be prevented.

In the following description of the present invention, a state of the stress layer observed by or a stress value measured by the two-dimensional birefringence measurement method is obtained at a position of a center axis of the capillary main body (tube axis of the capillary main body) when a side surface of the capillary main body is observed. Further, the stress-neutral layer refers to a layer having a compressive stress or a tensile stress of 5.0 MPa or less.

According to the present invention, in order to solve the above-mentioned problems, there is provided a capillary for holding an optical fiber, the capillary comprising a capillary main body being made of glass and formed in an elongated shape, wherein the capillary main body comprises: an accommodating portion configured to accommodate a part of an optical fiber; a first end surface formed at one end portion of the capillary main body in a longitudinal direction; and a second end surface formed at another end portion of the capillary main body in the longitudinal direction, wherein the accommodating portion comprises an opening portion, which is formed in the first end surface and is configured to allow insertion of the optical fiber, and wherein the capillary main body comprises: a compressive stress layer, which is formed on the opening portion and is observable by a two-dimensional birefringence measurement method; and a tensile stress layer, which is formed at a position away from the compressive stress layer toward the second end surface and is observable by the two-dimensional birefringence measurement method, and wherein a length of the compressive stress layer in the longitudinal direction of the capillary main body is longer than a length of the tensile stress layer in the longitudinal direction of the capillary main body.

With the configuration described above, a range in which the tensile stress layer is formed in the capillary main body is relatively smaller than a range in which the compressive stress is formed. Thus, when an external force acts on the portion in which the tensile stress layer is formed, the occurrence of chipping or cracking in the end portion of the capillary main body can be prevented. In addition, the portion of the capillary main body, in which the tensile stress layer is formed, can be set away from the first end surface by the length of the compressive stress layer. For the capillary, the first end surface has frequent external contact. Thus, when the position of the tensile stress layer is set away from the first end surface, the occurrence of chipping or cracking in the end portion of the capillary main body can be prevented.

According to the present invention, in order to solve the above-mentioned problems, there is provided a capillary for holding an optical fiber, the capillary comprising a capillary main body being made of glass and formed in an elongated shape, wherein the capillary main body comprises: an accommodating portion configured to accommodate a part of an optical fiber; a first end surface formed at one end portion of the capillary main body in a longitudinal direction; and a second end surface formed at another end portion of the capillary main body in the longitudinal direction, wherein the accommodating portion comprises an opening portion, which is formed in the first end surface and is configured to allow insertion of the optical fiber, and wherein the capillary main body comprises: a compressive stress layer, which is formed on the opening portion and is observable by a two-dimensional birefringence measurement method; and a tensile stress layer, which is formed at a position away from the compressive stress layer toward the second end surface and is observable by the two-dimensional birefringence measurement method, and wherein the tensile stress layer extends in the longitudinal direction from a position 0.1 mm or more away from the first end surface.

With the configuration described above, the portion of the capillary main body, in which the tensile stress layer is formed, is formed at a position away from the first end surface. For the capillary, the first end surface has frequent external contact. Thus, when the position of the tensile stress layer is set away from the first end surface, the occurrence of chipping or cracking in the end portion of the capillary main body can be prevented. The above-mentioned phrase “the tensile stress layer extends from a position 0.1 mm or more away from the first end surface” means that a distance between an end portion of the tensile stress layer, which is the closest to the first end surface, and the first end surface is 0.1 mm or more.

In the capillary of the present invention, it is preferred that the maximum value of the tensile stress in the tensile stress layer, which is measured by the two-dimensional birefringence measurement method, be 20 MPa or smaller. Thus, the tensile stress layer is less liable to be affected by the expansion and shrinkage of the adhesive used for the capillary main body or the expansion and shrinkage of the capillary main body. Further, even when a micro-scratch is formed in the capillary main body at the time of processing the capillary main body, the capillary main body is less liable to be affected by the scratch. Thus, the occurrence of cracking originating from the portion in which the tensile stress layer is formed can be prevented.

In the capillary of the present invention, it is preferred that the length of the stress-neutral layer in the longitudinal direction of the capillary main body be 0.01 mm or longer. Thus, the tensile stress layer is formed at a position 0.01 mm or more away from the compressive stress layer, and hence is less liable to be affected by the expansion and shrinkage of the adhesive used for the capillary main body or the expansion and shrinkage of the capillary main body. Further, even when a micro-scratch is formed in the capillary main body at the time of processing the capillary main body, the capillary main body is less liable to be affected by the scratch.

In the capillary of the present invention, the opening portion may have an inner wall surface formed in a tapered shape. With the configuration described above, the inner wall surface allows easy insertion of the optical fiber into the accommodating portion of the capillary main body.

In the capillary of the present invention, the opening portion may be filled with an adhesive. Thus, the optical fiber can be fixed to the capillary main body.

According to the present invention, in order to solve the above-mentioned problems, there is provided a method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising: a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, and wherein, in the heating step, the first end surface and the opening portion are heated to form a compressive stress layer observable by a two-dimensional birefringence measurement method on the opening portion, a tensile stress layer observable by the two-dimensional birefringence measurement method at a position away from the compressive stress layer toward the second end surface, and a stress-neutral layer observable by the two-dimensional birefringence measurement method between the compressive stress layer and the tensile stress layer.

With the configuration described above, the portion of the capillary main body, in which the compressive stress layer is formed through the heating step, is reinforced by the presence of the compressive stress layer. As a result, the occurrence of chipping or cracking in the end portion of the capillary main body can be prevented.

Further, when the portion of the capillary main body, in which the tensile stress layer is formed through the heating step, is formed at a position away from the compressive stress layer with the stress-neutral layer being formed therebetween, the maximum value of the tensile stress can be made as small as possible. As a result, the tensile stress layer is less liable to be affected by the expansion and shrinkage of the adhesive used for the capillary main body or the expansion and shrinkage of the capillary main body. Further, even when a micro-scratch is formed in the capillary main body at the time of processing the capillary main body, the capillary main body is less liable to be affected by the scratch. Thus, the occurrence of cracking originating from the portion in which the tensile stress layer is formed can be prevented.

Further, the portion of the capillary main body, in which the tensile stress layer is formed, is located at a position away from the compressive stress layer with the stress-neutral layer being formed therebetween. The maximum value of the tensile stress can be made as small as possible. As a result, the tensile stress layer is less liable to be affected by the expansion and shrinkage of the adhesive used for the capillary main body or the expansion and shrinkage of the capillary main body. Further, even when a micro-scratch is formed in the capillary main body at the time of processing the capillary main body, the capillary main body is less liable to be affected by the scratch. Thus, the occurrence of cracking originating from the portion in which the tensile stress layer is formed can be prevented. In addition, when the stress-neutral layer is formed, the portion of the capillary main body, in which the tensile stress layer is formed, is located at a position away from the first end surface by the length of the stress-neutral layer. For the capillary, the first end surface has frequent external contact. Thus, when the position of the tensile stress layer is set away from the first end surface, the occurrence of chipping or cracking in the end portion of the capillary main body can be prevented.

According to the present invention, in order to solve the above-mentioned problems, there is provided a method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising: a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, wherein, in the heating step, the first end surface and the opening portion are heated to form a compressive stress layer observable by a two-dimensional birefringence measurement method on the opening portion and a tensile stress layer observable by the two-dimensional birefringence measurement method at a position away from the compressive stress layer toward the second end surface, and wherein a length of the compressive stress layer in the longitudinal direction of the capillary main body is longer than a length of the tensile stress layer in the longitudinal direction of the capillary main body.

With the configuration described above, a range in which the tensile stress layer is formed in the capillary main body is relatively smaller than a range in which the compressive stress is formed. Thus, when an external force acts on the portion in which the tensile stress layer is formed, the occurrence of chipping or cracking in the end portion of the capillary main body can be prevented. In addition, the portion of the capillary main body, in which the tensile stress layer is formed, can be set away from the first end surface by the length of the compressive stress layer. For the capillary, the first end surface has frequent external contact. Thus, when the position of the tensile stress layer is set away from the first end surface, the occurrence of chipping or cracking in the end portion of the capillary main body can be prevented.

According to the present invention, in order to solve the above-mentioned problems, there is provided a method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising: a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, and wherein, in the heating step, the first end surface and the opening portion are heated to form a compressive stress layer observable by a two-dimensional birefringence measurement method on the opening portion, a tensile stress layer observable by the two-dimensional birefringence measurement method at a position away from the compressive stress layer toward the second end surface, and wherein the tensile stress layer extends in the longitudinal direction from a position 0.1 mm or more away from the first end surface.

With the configuration described above, the portion of the capillary main body, in which the tensile stress layer is formed, is formed at a position away from the first end surface. For the capillary, the first end surface has frequent external contact. Thus, when the position of the tensile stress layer is set away from the first end surface, the occurrence of chipping or cracking in the end portion of the capillary main body can be prevented. The above-mentioned phrase "the tensile stress layer extends from a position 0.1 mm or more away from the first end surface" means that a distance between an end portion of the tensile stress layer, which is the closest to the first end surface, and the first end surface is 0.1 mm or more.

According to the present invention, the method of manufacturing a capillary may comprise a cooling step of cooling the first end surface and the opening portion at a cooling rate of 100° C./second or lower. Thus, the maximum value of the tensile stress in the tensile stress layer formed in the capillary main body can be reduced as much as possible.

In the method of manufacturing a capillary according to the present invention, the laser beam may be a $CO_2$ laser beam.

Advantageous Effects of Invention

According to the present invention, the occurrence of cracking in the end portion of the capillary can be prevented.

DESCRIPTION OF EMBODIMENTS

Embodiments of the present invention are described below with reference to the drawings. FIG. 1 to FIG. 12 are illustrations of an embodiment of a capillary and a method of manufacturing the same according to the present invention.

Figure 1:
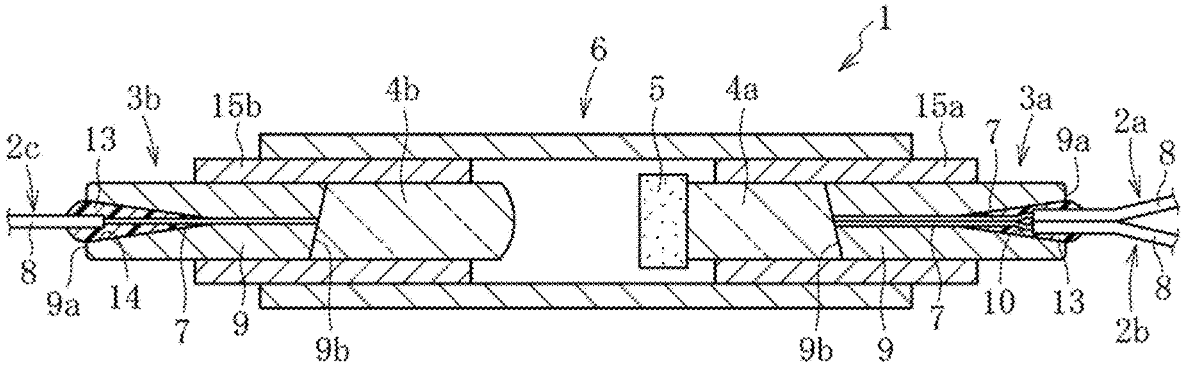
FIG. 1 is a sectional view of an optical device.

In FIG. 1, an optical device comprising capillaries according to the present invention is illustrated. In this embodiment, an optical multiplexer/demultiplexer is described as an example of the optical device. An optical device 1 mainly comprises a plurality of optical fibers 2*a* to 2*c*, a first capillary 3*a*, a second capillary 3*b*, lenses 4*a* and 4*b*, an optical filter 5, and an accommodating member 6. The first capillary 3*a* and the second capillary 3*b* are configured to hold the optical fibers 2*a* to 2*c*.

The optical fibers 2*a* to 2*c* comprise a first optical fiber 2*a*, a second optical fiber 2*b*, and a third optical fiber 2*c*. The first optical fiber 2*a* and the second optical fiber 2*b* are held by the first capillary 3*a*. The third optical fiber 2*c* is held by the second capillary 3*b*. Each of the optical fibers 2*a* to 2*c* comprises a clad 7 and a coating portion 8 that coats the clad 7. At a distal end portion of each of the optical fibers 2*a* to 2*c*, the clad 7 is exposed from the coating portion 8.

Figure 2:
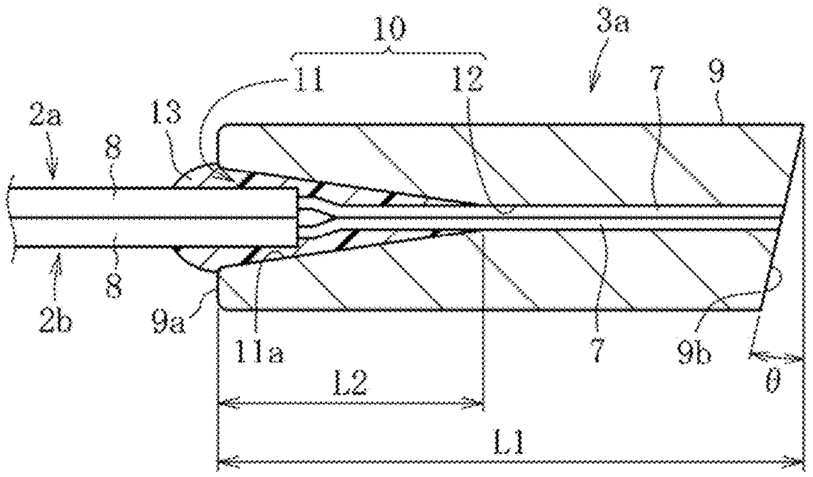
FIG. 2 is a sectional view of a first capillary.
Figure 3:
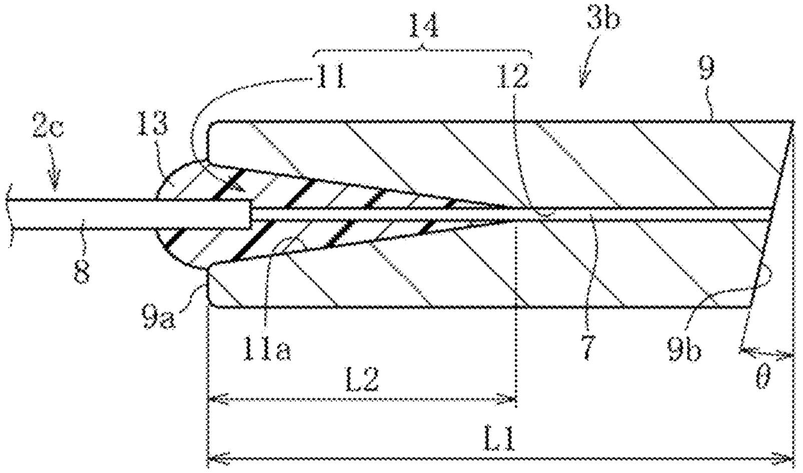
FIG. 3 is a sectional view of a second capillary.

As illustrated in FIG. 1 to FIG. 3, each of the first capillary 3*a* and the second capillary 3*b* comprises a capillary main body 9. The capillary main body 9 is made of glass and formed in an elongated shape. Specifically, it is preferred that the capillary main body 9 be made of borosilicate glass. However, a material of the capillary main body 9 is not limited to borosilicate glass and may be various other kinds of glass such as quartz glass, soda-lime glass, and crystallized glass. A thermal expansion coefficient of the capillary main body 9 is set to preferably $-3\times10^{-7}$/° C. or larger, more preferably $0\times10^{-7}$/° C. or larger, preferably $100\times10^{-7}$/° C. or smaller, more preferably $80\times10^{-7}$/° C. or smaller at a temperature failing within a range of, for example, from 30° C. to 380° C.

The capillary main body 9 is formed of a capillary tube having a cylindrical shape. However, a shape of the capillary main body 9 is not limited to that described in this embodiment. It is preferred that a length dimension L1 (see FIG. 2) of the capillary main body 9 be from 3 mm to 15 mm. It is preferred that an outer diameter of the capillary main body 9 be from 0.5 mm to 3 mm.

As illustrated in FIG. 1 and FIG. 2, the capillary main body 9 of the first capillary 3*a* comprises an accommodating portion (hereinafter referred to as "first accommodating portion") 10, a first end surface 9*a*, and a second end surface 9*b*. The accommodating portion 10 accommodates a part of the first optical fiber 2*a* and a part of the second optical fiber 2*b*. The first end surface 9*a* is formed at one end portion of the capillary main body 9 in a longitudinal direction. The second end surface 9*b* is formed at another end portion of the capillary main body 9 in the longitudinal direction.

The first accommodating portion 10 comprises an opening portion (in a tapered shape) 11 and a through hole 12. The clads 7 of the first optical fiber 2*a* and the second optical fiber 2*b* can be inserted into the opening portion 11. The clad 7 of the first optical fiber 2*a* and the clad 7 of the second optical fiber 2*b* can be accommodated in the through hole 12.

In this embodiment, the clad 7 of the first optical fiber 2*a* and the clad 7 of the second optical fiber 2*b* are inserted into one through hole 12 of the first accommodating portion 10. The through hole 12 can be formed in various shapes such as a circular or rectangular sectional shape. When an outer diameter of the clad 7 of the first optical fiber 2*a* and an outer diameter of the clad 7 of the second optical fiber 2*b* are different from each other, the through hole 12 may have concavely curved surfaces with different radii of curvature so as to hold outer surfaces of the clads 7. It is preferred that a hole diameter of the through hole 12 be from 0.05 mm to 1.0 mm.

A configuration of the through hole is not limited to that described above. For example, the first accommodating portion 10 may have a plurality of (may be three or more) through holes so that clads of a plurality of (may be three or more) optical fibers are individually inserted into the through holes, respectively.

The opening portion 11 serves as a guide portion configured to allow easy insertion of the clad 7 of the first optical fiber 2*a* and the clad 7 of the second optical fiber 2*b* into the through hole 12. The opening portion 11 is formed on the first end surface 9*a* side of the capillary main body 9. When the capillary main body 9 has a plurality of through holes 12, it is preferred that the opening portion 11 be formed so as to communicate with all the through holes 12.

The opening portion 11 has an inner wall surface 11*a* formed in a tapered shape. The inner wall surface 11*a* is a surface gradually radially expanding from the second end surface 9*b* side toward the first end surface 9*a* of the capillary main body 9.

It is preferred that a length dimension L2 (see FIG. 2) of the opening portion 11 in the longitudinal direction of the capillary main body 9 be from 0.5 mm to 7 mm. It is preferred that a maximum opening diameter of the opening portion 11 be from 0.5 mm to 1.5 mm. It is preferred that a minimum opening diameter of the opening portion 11 be from 0.3 mm to 1.3 mm.

An adhesive 13 fills the opening portion 11 so as to fix a part of the first optical fiber 2*a* and a part of the second optical fiber 2*b*, which are accommodated in the first accommodating portion 10. Specifically, a space defined by the inner wall surface 11*a* of the opening portion 11 functions as a filled portion to be filled with the adhesive 13. The adhesive 13 filling the opening portion 11 is present between the first optical fiber 2*a* and the second optical fiber 2*b* and the inner wall surface 11*a* to thereby fix each of the optical fibers 2*a* and 2*b* to the first capillary 3*a*. Although not shown, the adhesive 13 also fills the through hole 12 (between an inner surface of the through hole 12 and outer surfaces of the clads 7).

As the adhesive 13, for example, an epoxy-based adhesive is used. However, the adhesive 13 is not limited to the epoxy-based adhesive. For example, a silicone-based or acrylic adhesive or a photocurable adhesive (for example, a UV-curable adhesive) may be used. A thermal expansion coefficient of the adhesive 13 is set to fall within a range of from $10\times10^{-6}$/° C. to $100\times10^{-6}$/° C.

The first end surface 9*a* of the capillary main body 9 is a surface formed so as to be orthogonal to the longitudinal direction of the capillary main body 9. The second end surface 9*b* of the capillary main body 9 is a surface inclined with respect to a direction orthogonal to the longitudinal direction of the capillary main body 9. It is preferred that an inclination angle θ (see FIG. 2) of the second end surface 9*b* be from 3° to 10°.

Distal end portions of the clads 7 of the first optical fiber 2*a* and the second optical fiber 2*b*, which are inserted into the through hole 12, have inclined surfaces so as to be flush with the second end surface 9*b*.

As illustrated in FIG. 1 and FIG. 3, the capillary main body 9 of the second capillary 3*b* comprises an accommodating portion (hereinafter referred to as "second accommodating portion") 14 configured to accommodate a part of the third optical fiber 2*c*. The second accommodating portion 14 comprises an opening portion 11 and a through hole 12. The third optical fiber 2*c* can be inserted into the opening portion 11. The clad 7 of the third optical fiber 2*c* is inserted into the through hole 12. Other configurations of the second capillary 3*b* are the same as those of the first capillary 3*a*. Constituent elements of the second capillary 3*b*, which are common to the first capillary 3*a*, are denoted by the same reference symbols.

Figure 4:
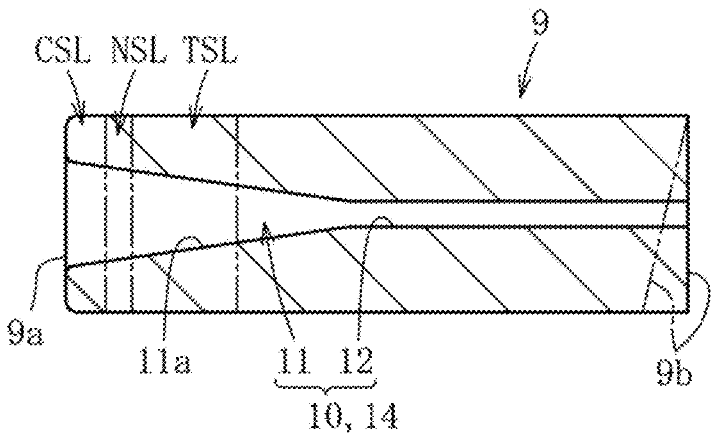
FIG. 4 is a sectional view for illustrating a capillary main body.
Figure 5:
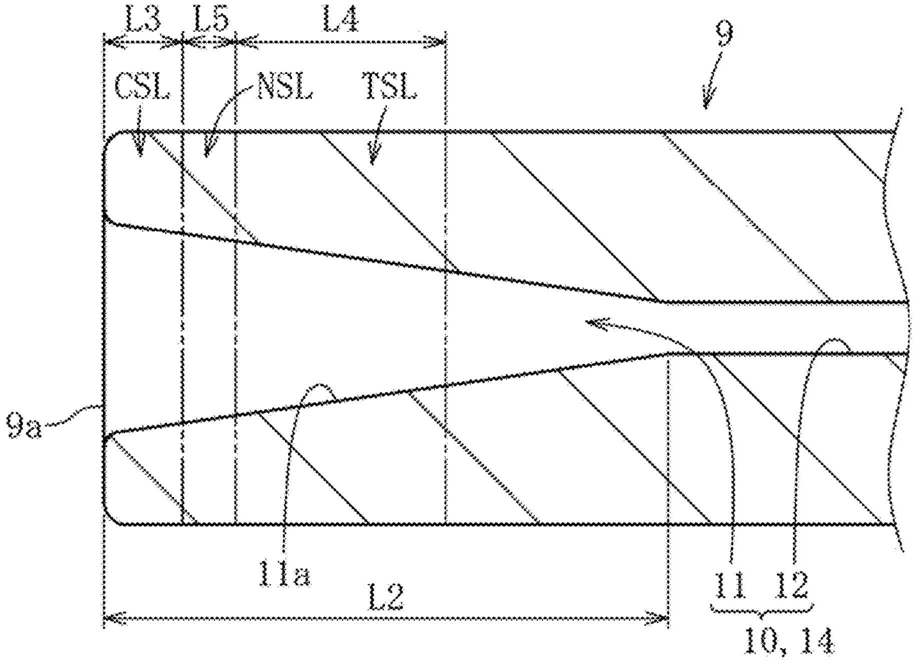
FIG. 5 is a sectional view of an end portion of the capillary main body.

In FIG. 4 and FIG. 5, the capillary main body 9 before the optical fibers 2*a* to 2*c* are mounted thereinto is illustrated. The capillary main body 9 comprises a compressive stress layer CSL, a tensile stress layer TSL, and a stress-neutral layer NSL. The compressive stress layer CSL is formed so as to include the first end surface 9*a* and the opening portion 11. The tensile stress layer TSL is formed at a position away from the compressive stress layer CSL toward the second end surface 9*b*. The stress-neutral layer NSL is formed between the compressive stress layer CSL and the tensile stress layer TSL.

Figure 6:
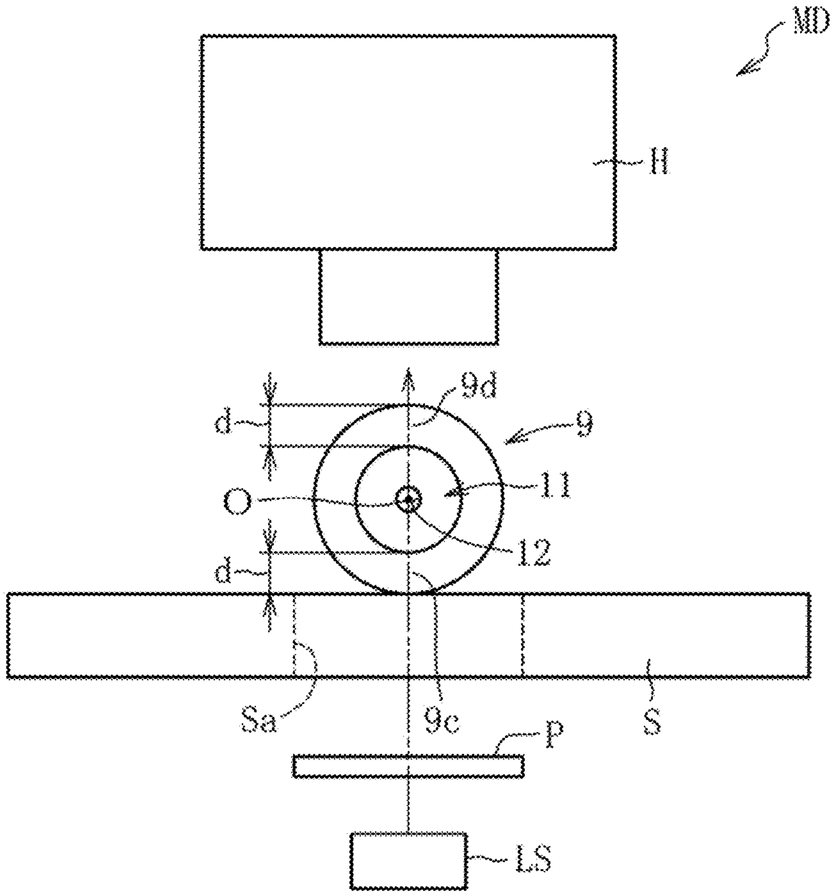
FIG. 6 is a side view for illustrating a device for measuring a stress in the capillary main body.

Observation of a direction of a stress and measurement of a value of the stress in each of the compressive stress layer CSL, the tensile stress layer TSL, and the stress-neutral layer NSL are executed by a two-dimensional birefringence measurement method. In FIG. 6, a measurement device that enables the execution of the two-dimensional birefringence measurement method is illustrated. As a measurement device MD, a commercially available device (for example, a two-dimensional birefringence evaluation system WPA-100 model manufactured by Photonic Lattice, Inc.) can be used.

The measurement device MD comprises a stage S, a light source LS, a polarizing member P, and a measurement unit H. The capillary main body 9 being a target to be measured is placed on the stage S. The light source LS is provided below the stage S. The polarizing member P is provided between the light source LS and the stage S. The measurement unit H is provided above the stage S. Besides, the measurement device MD comprises an arithmetic device and a display device. The arithmetic device is configured to perform an arithmetic process on data measured by the measurement unit H. The display device is configured to display the result of measurement.

The stage S has an opening portion Sa. Light emitted from the light source LS is allowed to pass upward through the opening portion Sa. The capillary main body 9 is placed on the stage S so as to overlap the opening portion Sa of the stage S. The capillary main body 9 is placed on the stage S so that a side surface of the capillary main body 9 is brought into contact with the stage S, specifically, a center axis O of the capillary main body 9 becomes parallel to a placement surface of the stage S.

The measurement unit H is formed of, for example, a polarization imaging camera. The measurement unit H comprises, for example, an objective lens, a polarization array, and a CCD device. The polarization array is configured to pick up an image formed through the objective lens.

After being transmitted through the polarizing member P, the light emitted from the light source LS is radiated onto the capillary main body 9. After that, the light is transmitted through the capillary main body 9 and reaches the measurement unit H. In this case, after being transmitted through a lower part 9*c* of the capillary main body 9 and passing through the opening portion 11 being a hollow portion, the light is transmitted through an upper part 9*d* of the capillary main body 9.

The arithmetic device performs a predetermined arithmetic process on data about polarized light measured by the measurement unit H to thereby calculate a retardation of the polarized light. Further, the arithmetic device calculates a stress value of the capillary main body 9 based on the retardation. A relationship between the retardation and the stress is expressed by the following Expression (1).

$$\delta=\beta\times F\times d \quad (1)$$

where δ represents a retardation (nm), β represents an optical elastic constant ($10^{-12}$/Pa), F represents a stress ($10^{5}$ Pa), and "d" represents a wall thickness (cm) of the capillary main body 9.

It is desirable that the measurement of a stress by the measurement device MD described above be performed only on the lower part 9*c* or the upper part 9*d* of the capillary main body 9. With the structure of the measurement device MD and the shape of the capillary main body 9 described above, however, it is difficult to perform such a measurement. Thus, the polarized light, which has been transmitted through the lower part 9*c* and the upper part 9*d* of the capillary main body 9 placed on the stage S, is measured from above the capillary main body 9 by the measurement unit H. Specifically, the measurement unit H is located above the capillary main body 9 and measures an area in which the lower part 9*c* and the upper part 9*d* overlap each other. Thus, in this embodiment, the retardation δ is calculated by using a sum of a wall thickness of the lower part 9*c* and a wall thickness of the upper part 9*d*, specifically, a value (2d) two times larger than the wall thickness "d" of the capillary main body 9, as the wall thickness "d" of the capillary main body in Expression (1) given above. In other words, the wall thickness "d" of the capillary main body 9 can be calculated from a difference between an outer diameter and an inner diameter of the capillary main body 9. In a strict sense, when the inner wall surface 11*a* of the opening portion 11 is formed in a tapered shape, the wall thickness "d" of the capillary main body 9 changes each time in accordance with a measured portion. However, it is complicated to set a value of the wall thickness "d" again in accordance with the measured portion. Thus, for convenience, in the present invention, the value of the wall thickness is fixed with a value of the outer diameter and a value of the inner diameter of the capillary main body 9 on the first end surface 9*a* to calculate the retardation δ.

The arithmetic processing device enables display of an image for showing a distribution state of a stress in the capillary main body 9 (hereinafter referred to as "stress state image") on the display device. Lengths L3 to L5 of the stress layers CSL, TSL, and NSL in the longitudinal direction of the capillary main body 9 can be measured based on the stress state image displayed on the display device, respectively.

The compressive stress layer CSL is formed so as to include the first end surface 9*a* of the capillary main body 9 and a surface layer portion thereof. Further, the compressive stress layer CSL is formed in an edge portion (boundary portion between the inner wall surface 11*a* and the first end surface 9*a*) of the opening portion 11 and a part of the inner wall surface 11*a* of the opening portion 11 in the vicinity of the first end surface 9*a*. The compressive stress layer CSL may be located at such a position that its end portion (end portion on the first end surface 9*a* side) is away from the first end surface 9*a*. In this case, it is preferred that a distance between the first end surface 9*a* and the end portion of the compressive stress layer CSL be set to from 0 mm to 0.5 mm, more preferably from 0 mm to 0.1 mm.

The length (width) dimension L3 (see FIG. 5) of the compressive stress layer CSL in the longitudinal direction of the capillary main body 9 is preferably from 0.01 mm to 2 mm, more preferably from 0.1 mm to 1.5 mm, further preferably from 0.4 mm to 1.2 mm. It is preferred that a maximum value of a compressive stress in the compressive stress layer CSL be larger than 5 MPa and equal to or smaller than 15 MPa.

The tensile stress layer TSL is formed in a region (inside the capillary main body 9) between the inner wall surface 11*a* of the opening portion 11 and an outer surface of the capillary main body 9, which is away from the compressive stress layer CSL toward the second end surface 9*b*.

The length (width) dimension L4 (see FIG. 5) of the tensile stress layer TSL in the longitudinal direction of the capillary main body 9 is preferably from 0.1 mm to 1 mm, more preferably from 0.1 mm to 0.7 mm, further preferably from 0.2 mm to 0.5 mm. It is preferred that the maximum value of the tensile stress layer TSL be larger than 5 MPa and equal to or smaller than 20 MPa.

The stress-neutral layer NSL is a layer between the compressive stress layer CSL and the tensile stress layer TSL, which has a compressive stress or a tensile stress of 5 MPa or less.

A length (width) dimension L5 (see FIG. 5) of the stress-neutral layer NSL in the longitudinal direction of the capillary main body 9, specifically, a distance between the compressive stress layer CSL and the tensile stress layer TSL is preferably from 0.01 mm to 1 mm, more preferably from 0.05 mm to 0.5 mm, further preferably from 0.05 mm to 0.1 mm.

Before the optical fibers 2*a* to 2*c* are fixed, the second end surface 9*b* of the capillary main body 9 is formed as a flat surface being orthogonal to the longitudinal direction of the capillary main body 9 as indicated by a solid line in FIG. 4. After the clads 7 of the optical fibers 2*a* to 2*c* are inserted into the through hole 12, and the optical fibers 2*a* to 2*c* are fixed inside the through hole 12 with the adhesive 13, the second end surface 9*b* is polished. Thus, the second end surface 9*b* is formed as a surface inclined with respect to the direction orthogonal to the longitudinal direction of the capillary main body 9 as indicated by a two-dot-dash line in FIG. 4.

The lenses 4*a* and 4*b* comprise a first lens 4*a* and a second lens 4*b*. The first lens 4*a* is arranged between the first capillary 3*a* and the optical filter 5. The second lens 4*b* is arranged between the second capillary 3*b* and the optical filter 5. Each of the lenses 4*a* and 4*b* is formed of, for example, a columnar lens (so-called C lens) with a uniform refractive index, which has a partially spherical lens surface at one end portion, or a graded-index columnar lens (so-called GRIN lens). However, the lenses are not limited to those described above. Various types of lenses including, for example, a uniform refractive index lens having two partially spherical lens surfaces with the same curvature center at both ends (so-called drum lens) may be used.

As illustrated in FIG. 1, the first lens 4*a* is held in a first support member 15*a* arranged inside the accommodating member 6. The first support member 15*a* is formed of a cylindrical member made of glass. A part of the first lens 4*a* is inserted into one end portion of the first support member 15*a*. A part of the capillary main body 9 of the first capillary 3*a* is inserted into another end portion of the first support member 15*a*. The second lens 4*b* is held in a second support member 15*b* arranged inside the accommodating member 6. The second support member 15*b* is formed of a cylindrical member made of glass. A part of the second lens 4*b* is inserted into one end portion of the second support member 15*b*. A part of the capillary main body 9 of the second capillary 3*b* is inserted into another end portion of the second support member 15*b*. The support members 15*a* and 15*b* are fixed inside the accommodating member 6 with an adhesive (not shown).

The optical filter 5 is formed of, for example, a WDM filter. The optical filter 5 is not limited to the WDM filter and may be other optical elements. The optical filter 5 is arranged between the first lens 4*a* and the second lens 4*b* inside the accommodating member 6. The optical filter 5 is fixed to one end portion of the first lens 4*a* with an adhesive (not shown).

The accommodating member 6 is formed in a cylindrical shape. However, a shape of the accommodating member 6 is not limited to the cylindrical shape. The accommodating member 6 accommodates the first lens 4*a*, the second lens 4*b*, the optical filter 5, the first support member 15*a*, the second support member 15*b*, the first capillary 3*a*, and the second capillary 3*b*.

The optical device 1 having the above-mentioned configuration has two modes of use. A first mode of use is a demultiplexing mode in which, when, for example, multiple light beams having two wavelengths are emitted from the first optical fiber 2*a*, a light beam having one wavelength is reflected by one end surface of the optical filter 5 and is incident on the second optical fiber 2*b* and a light beam having another wavelength is transmitted through the optical filter 5 and is incident on the third optical fiber 2*c*. A second mode of use is a multiplexing mode in which, when single light beams having different wavelengths are emitted from the first optical fiber 2*a* and the third optical fiber 2*c*, respectively, those two kinds of single light beams are both incident on the second optical fiber 2*b*.

Figure 7:
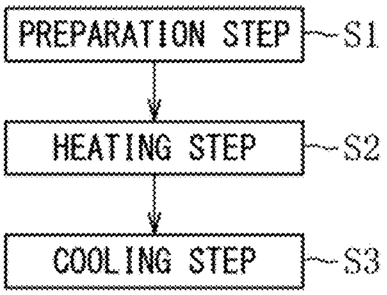
FIG. 7 is a flowchart for illustrating a method of manufacturing a capillary.

Now, a method of manufacturing the capillary main body 9 having the configuration described above is described. As illustrated in FIG. 7, this method comprises a preparation step S1, a heating step S2, and a cooling step S3.

Figure 8:
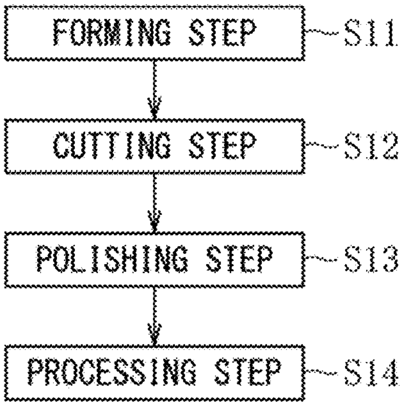
FIG. 8 is a flowchart for illustrating a preparation step of the method of manufacturing a capillary.

The preparation step S1 is a step of preparing the capillary main body 9. As illustrated in FIG. 8, the preparation step S1 comprises a forming step S11, a cutting step S12, a polishing step S13, and a processing step S14.

In the forming step S11, a glass tube (capillary tube) is formed by, for example, a redraw method. With the redraw method, a glass preform is heated so that a part thereof is stretched to thereby form a glass tube having a desired diameter. In the cutting step S12, the glass tube formed through the forming step S11 is cut to have a predetermined length. After that, a plurality of glass tubes obtained by cutting are bundled together, and the bundle of the glass tubes is cut shorter.

In the polishing step S13, each of the end surfaces of the glass tube in the longitudinal direction, which are formed in the cutting step S12, is polished with a polisher such as a grindstone. Thus, for example, a crack formed in an end surface of the glass tube in the cutting step S12 can be eliminated. When a crack in the end surface of the glass tube is small, the polishing step S13 can be omitted.

Figure 9:
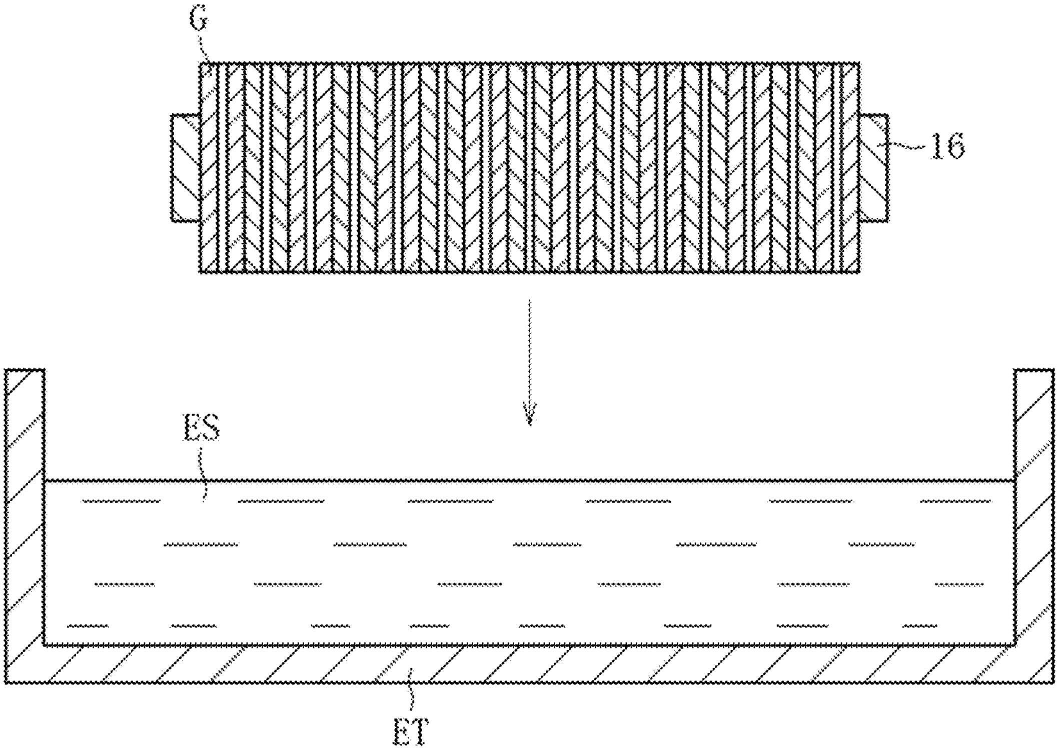
FIG. 9 is a sectional view for illustrating a processing step of the method of manufacturing a capillary.
Figure 10:
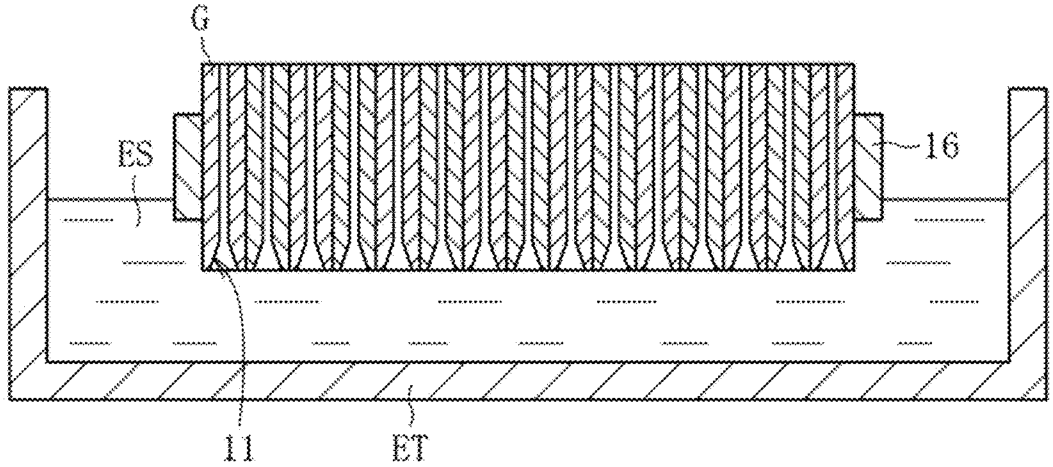
FIG. 10 is a sectional view for illustrating the processing step of the method of manufacturing a capillary.

In the processing step S14, a plurality of glass tubes G are held with a holding member 16 such as a banding band as illustrated in FIG. 9 to thereby form a bundle of the glass tubes G. After that, as illustrated in FIG. 10, the bundle of the glass tubes G is immersed into an etching solution ES containing, for example, hydrofluoric acid, which is stored in an etching tank ET. As a result, end surfaces and inner surfaces of the glass tubes G are subjected to an etching treatment. Further, the opening portion 11 having a tapered shape is formed in one end portion of each of the glass tubes G by the etching treatment. A length of the holding member 16 may be the same as a length of each of the glass tubes G. The holding member 16 holds the glass tubes G so that end portions of the holding member 16 are aligned with end portions of each of the glass tubes G to thereby prevent a side surface of each of the glass tubes G from being subjected to the etching treatment that is unnecessary therefor.

Through the process described above, the capillary main body 9 having the first end surface 9*a* with the opening portion 11 is prepared.

In the processing step S14, a method of forming the opening portion 11 (inner wall surface 11*a*) in one end portion of the glass tube G is not limited to the above-mentioned etching and may also be machining (for example, grinding with a drill or the like).

Next, in the heating step S2, the first end surface 9*a* and the opening portion 11 of the capillary main body 9 are irradiated with a laser beam L to thereby heat the first end surface 9*a* and the opening portion 11.

Figure 11:
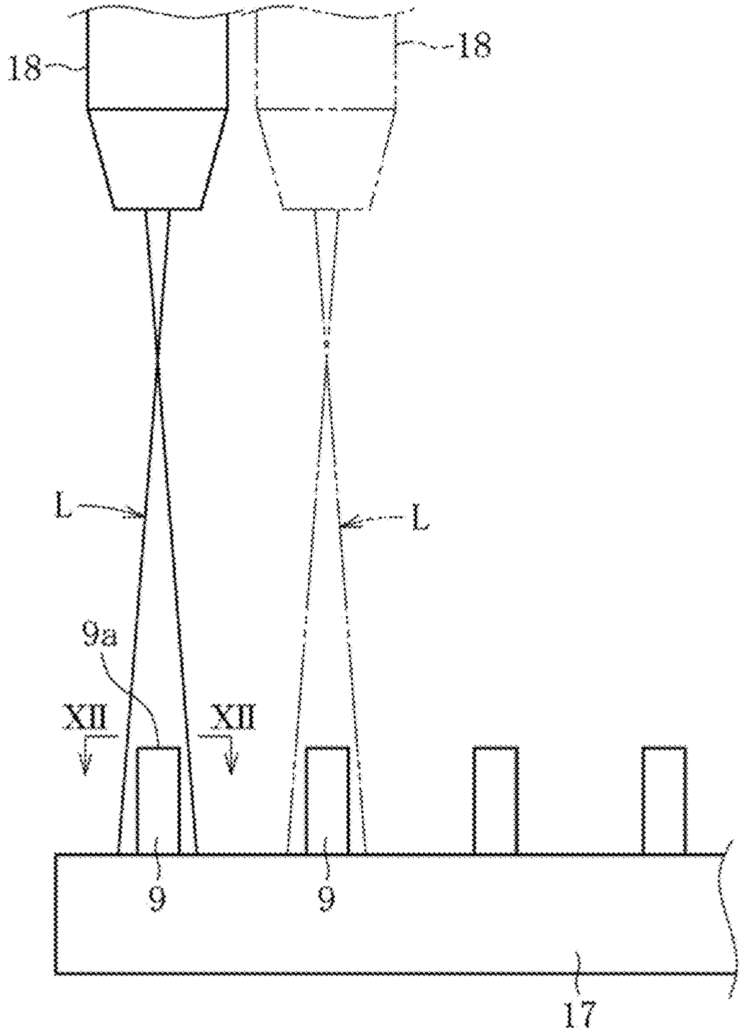
FIG. 11 is a side view for illustrating a heating step of the method of manufacturing a capillary.

Specifically, as illustrated in FIG. 11, the capillary main bodies 9 are supported on a support device 17 so that the first end surfaces 9*a* of the capillary main bodies 9 face upward. After that, the laser beam L is radiated (spot irradiation) from a laser irradiation device 18, which is stopped above the support device 17, toward the first end surface 9*a* of the capillary main body 9. It is preferred that the laser beam L radiated onto the capillary main body 9 be a $CO_2$ laser beam. However, a kind of the laser beam L is not limited to that described in this embodiment.

Figure 12:
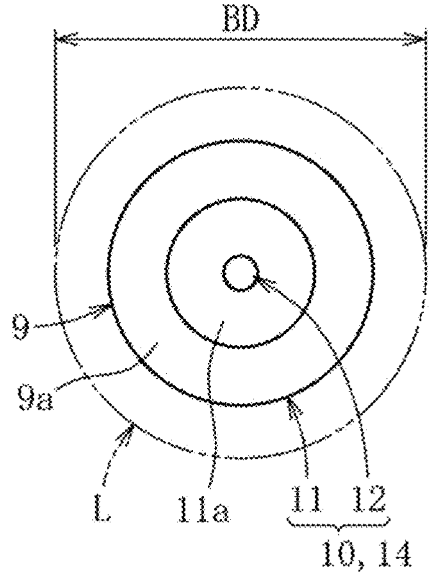
FIG. 12 is a plan view as viewed in the direction indicated by the arrows of the line XII-XII of FIG. 11.

In the heating step S2, it is preferred that an output of the laser irradiation device 18 be set to 3 W to 50 W. It is preferred that irradiation time of the laser beam L be set to 1 second to 10 seconds. As illustrated in FIG. 12, it is preferred that the laser beam L having a beam diameter BD larger than a diameter of the first end surface 9*a* be radiated onto the first end surface 9*a* and the opening portion 11 in the heating step S2. It is preferred that the beam diameter BD be 1.1 times to 2.5 times larger than the diameter of the first end surface 9*a*.

The above-mentioned irradiation with the laser beam L softens the entire first end surface 9*a* to eliminate microcracks, which have remained in the first end surface 9*a* and the opening portion 11. Further, the irradiation with the laser beam L softens a peripheral edge portion of the first end surface 9*a* (boundary portion between the first end surface 9*a* and an outer peripheral surface), the edge portion of the opening portion 11, and a part of the inner wall surface 11*a*. Those softened portions are subjected to chamfering.

After completion of the spot irradiation with the laser beam L to the first end surface 9*a* of the capillary main body 9, the laser irradiation device 18 stops the irradiation with the laser beam L. After that, the laser irradiation device 18 and the support device 17 are moved relative to each other so that the next capillary main body 9 is arranged below the laser irradiation device 18 as indicated by two-dot-dash lines in FIG. 11. After that, the spot irradiation with the laser beam L is performed on the first end surface 9*a* of the next capillary main body 9 while the laser irradiation device 18 is in a stopped state. Thus, the laser irradiation device 18 repeatedly carries out the heating step S2 for each of the plurality of capillary main bodies 9 supported on the support device 17 while being in an immobile and stopped state.

This method enables the formation of the compressive stress layer CSL, the tensile stress layer TSL, and the stress-neutral layer NSL in the capillary main body 9 through the heating step S2 and the cooling step S3 described later.

It is preferred that the capillary maim body 9 be annealed in the cooling step S3 so as to form the compressive stress layer CSL, the tensile stress layer TSL, and the stress-neutral layer NSL in the capillary main body 9. A cooling rate for the annealing of the capillary main body 9 is preferably from 10° C./second to 100° C./second, more preferably from 20° C./second to 80° C./second, further preferably from 30° C./second to 70° C./second. When an upper limit of the cooling rate falls within the above-mentioned range, the stress-neutral layer NSL can be formed between the compressive stress layer CSL and the tensile stress layer TSL. Further, a maximum value of the tensile stress in the tensile stress layer TSL can be set to 20 MPa or smaller. Further, a length of the stress-neutral layer NSL can be set to 0.01 mm or larger. Further, when a lower limit of the cooling rate falls within the above-mentioned range, a reduction in production efficiency can be prevented. When a method of irradiating with the laser beam L is spot irradiation, the cooling rate can be controlled to fall within the above-mentioned range. Here, the cooling rate refers to a cooling rate within a temperature range from a temperature at which the entire surface of the first end surface 9*a* is softened through heating to a temperature at which the entire surface of the first end surface 9*a* reaches its strain point as a result of cooling. It is preferred that the cooling step S3 be carried out in a temperature-controlled space. The cooling step S3 can also be carried out by gradually reducing an output of the laser beam L.

With the above-mentioned capillary main body 9 and the method of manufacturing the capillary main body according to this embodiment, the compressive stress layer CSL is formed in the capillary main body 9 through the heating step S2 and the cooling step S3. As a result, the first end surface 9*a* and the opening portion 11 of the capillary main body 9 can be reinforced with the compressive stress layer CSL. As a result, occurrence of chipping or cracking in the end portion (the first end surface 9*a* and the opening portion 11) of the capillary main body 9 can be prevented.

In addition to the effects described above, the inventors of the present invention have found the following effects of the present invention as a result of intensive studies.

The adhesive 13 filling the opening portion 11 tends to expand and shrink due to a temperature change under an environment where the optical device 1 is used. In this case, the inner wall surface 11*a* of the opening portion 11 expands in such a way as to follow the expansion of the adhesive 13. As a result, cracking, which originates from a microcrack in the opening portion 11, may occur in the opening portion 11. In particular, when the value (maximum value) of the tensile stress in the tensile stress layer TSL is large, this phenomenon is noticeable.

In order to prevent the above-mentioned occurrence of cracking in the capillary main body 9, the tensile stress layer TSL is formed at a position away from the compressive stress layer CSL, specifically, the stress-neutral layer NSL is formed between the compressive stress layer CSL and the tensile stress layer TSL. As a result, the value (maximum value) of the tensile stress in the tensile stress layer TSL is successfully reduced as much as possible. Thus, even when the tensile stress layer TSL is formed in such a manner as to extend into the opening portion 11, the occurrence of cracking in the end portion of the capillary main body 9, which is caused by the expansion and shrinkage of the adhesive 13, can be prevented.

Examples

The inventors of the present invention conducted verification tests so as to confirm the effects of the present invention. Now, examples of the present invention are described. However, the present invention is not limited to the examples.

First, a capillary main body made of glass was manufactured through the steps of FIG. 8. The capillary main body had a tapered shape, a length of 8 mm, an outer diameter of 1.8 mm, and a through hole with a rectangular shape having hole dimensions of 0.51 mm×0.51 mm. The used glass was borosilicate glass containing $SiO_2$ at 70%, $B_2O_3$ at 15%, $Al_2O_3$ at 5%, CaO at 1%, BaO at 1%, $Na_2O$ at 7%, and $K_2O$ at 1% in percent by mass.

Figure 13:
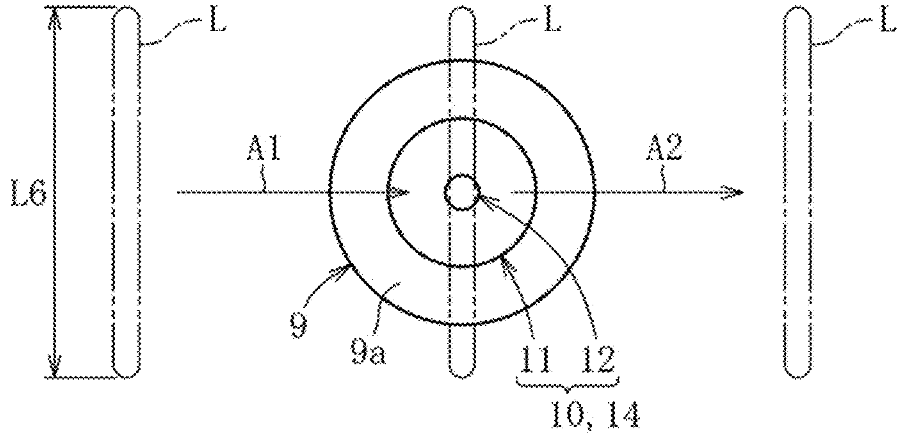
FIG. 13 is a plan view for illustrating a heating method for a capillary main body according to Comparative Example.

Capillary main bodies of Examples 1 to 3 were obtained through the steps of FIG. 7. The manufacturing method according to the embodiment described above used spot irradiation as a method of irradiating with a laser beam. Meanwhile, a capillary main body of Comparative Example was obtained also through the steps of FIG. 7 but by using scanning irradiation as the method of irradiating with a laser beam (see FIG. 13). As illustrated in FIG. 13, the scanning irradiation used a linear laser beam L having a length L6 larger than the diameter of the first end surface 9*a* of the capillary main body 9. In this case, as indicated by arrows A1 and A2 in FIG. 13, the laser beam L was linearly moved without being stopped so as to pass on the end portion of the capillary main body 9.

After that, sixteen optical fibers were inserted from the opening portion toward the through hole. Then, the opening portion was filled with an adhesive to thereby manufacture a capillary for holding optical fibers.

A temperature cycling test (twenty-four cycles of temperature changes within a range of from −40° C. to 85° C.) was performed on one thousand samples obtained in each of Examples 1 to 3 and Comparative Example. After that, the presence or absence of cracking in the end portion (the first end surface and the opening portion) was checked with use of an optical microscope.

Figure 14:
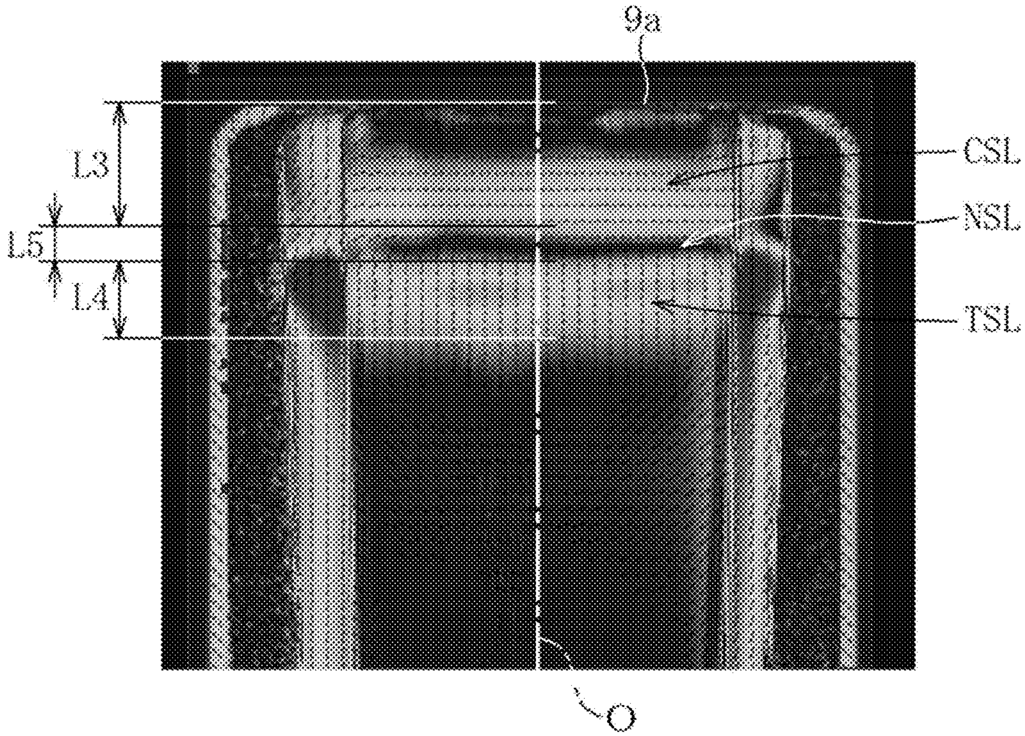
FIG. 14 is a stress state image of a capillary main body according to Example 1.
Figure 15:
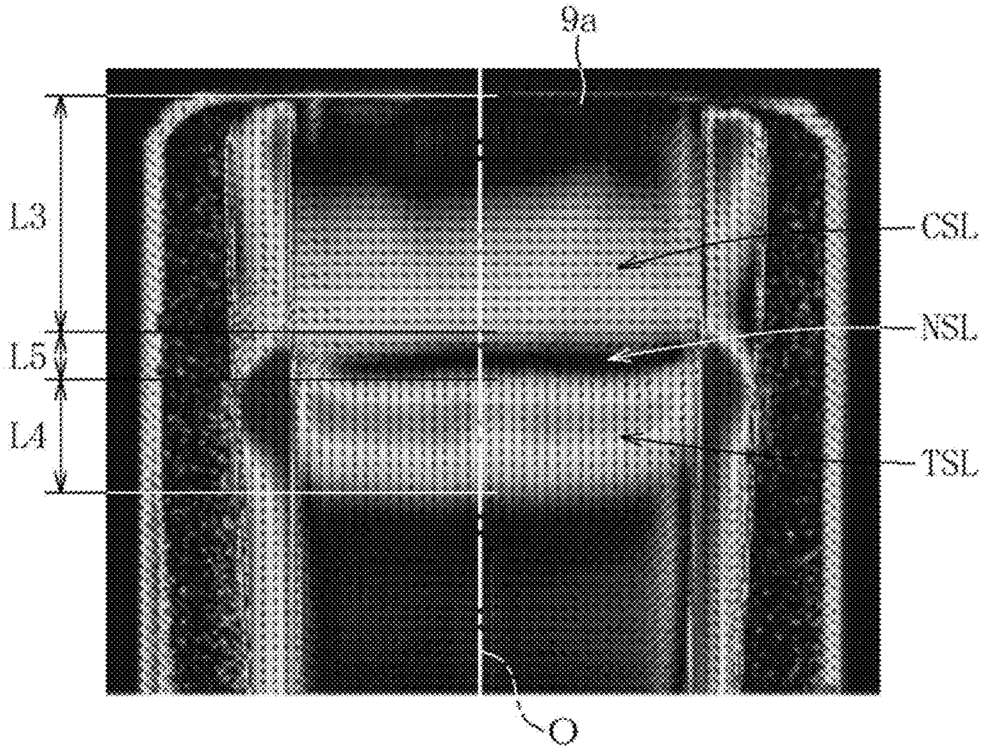
FIG. 15 is a stress state image of a capillary main body according to Example 2.
Figure 16:
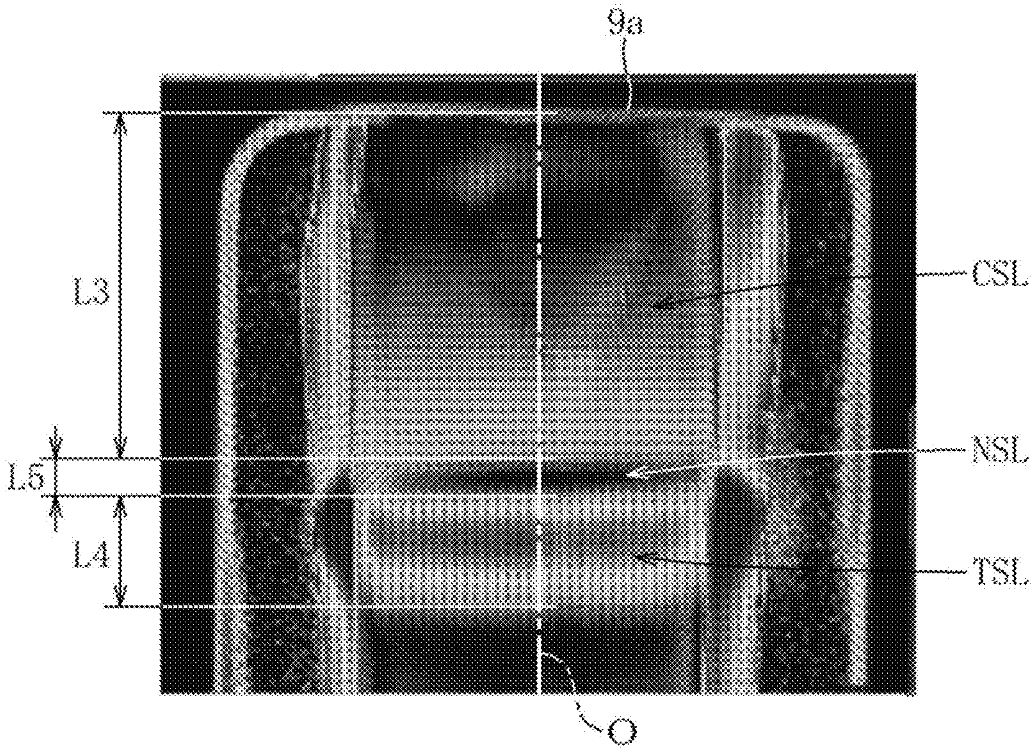
FIG. 16 is a stress state image of a capillary main body according to Example 3.
Figure 17:
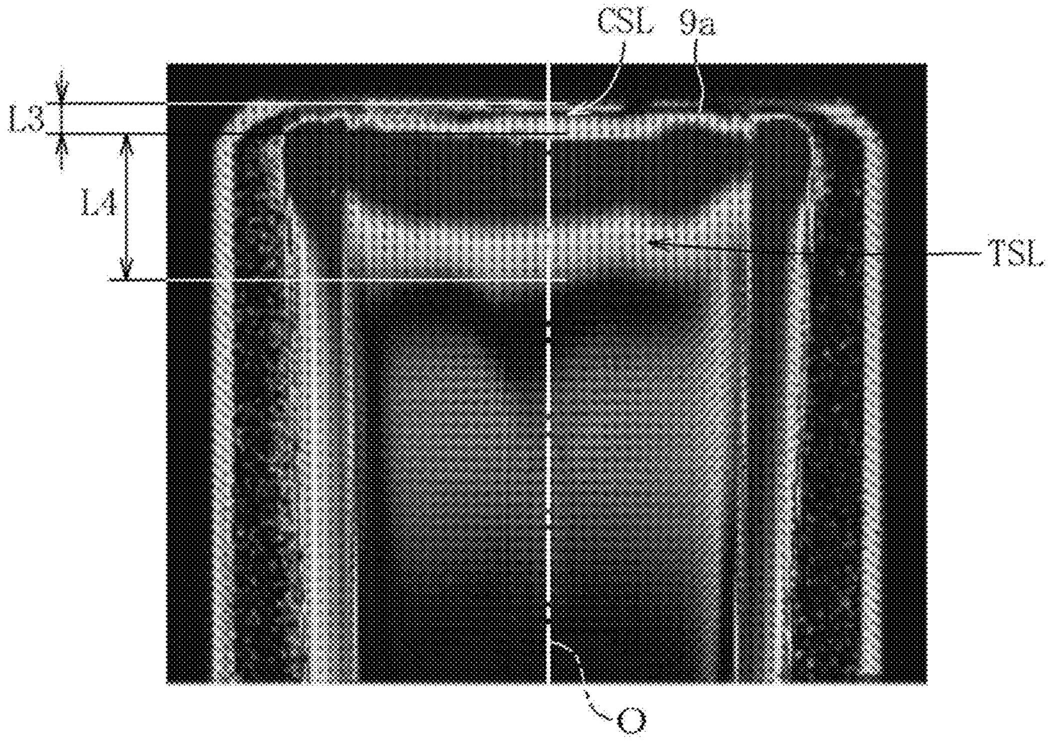
FIG. 17 is a stress state image of the capillary main body according to Comparative Example.

The results of tests for Examples 1 to 3 and Comparative Example are shown in FIG. 1 and illustrated in FIG. 14 to FIG. 17. FIG. 14 is a stress state image for Example 1, FIG. 15 is a stress state image for Example 2, FIG. 16 is a stress state image for Example 3, and FIG. 17 is a stress state image for Comparative Example. A stress in each of the samples was observed and measured with use of a measurement device that enables the execution of the two-dimensional birefringence measurement method (WPA-100 model manufactured by Photonic Lattice Inc.).

TABLE 1

| | Example 1 | Example 2 | Example 3 | Comparative Example |
|---|---|---|---|---|
| Laser irradiation method | Spot | Spot | Spot | Scanning |
| Laser output (w) | 18 | 18 | 18 | 10 |
| Laser irradiation time (second) | 3 | 4.5 | 7 | — |
| Laser scanning speed (mm/minute) | — | — | — | 500 |
| Cooling rate for capillary (° C./second) | 20 | 30 | 40 | 15 |
| Presence or absence of stress-neutral layer | Present | Present | Present | Absent |
| Length (width in longitudinal direction) of compressive stress layer (CSL) (mm) | 0.45 | 0.77 | 1.15 | 0.05 |
| Length (width in longitudinal direction) of stress-neutral layer (NSL) (mm) | 0.07 | 0.10 | 0.10 | — |
| Length (width in longitudinal direction) of tensile stress layer (TSL) (mm) | 0.31 | 0.36 | 0.41 | 0.59 |
| Distance of tensile stress layer from first end surface (mm) | 0.52 | 0.87 | 1.25 | 0.05 |
| Maximum value of tensile stress in tensile stress layer (MPa) | 14.5 | 15.2 | 15.7 | 30.4 |
| Rate of occurrence of cracking in end portion of capillary main body (%) | 0.2 | 0.9 | 1.0 | 21.7 |

As shown in Table 1 and illustrated in FIG. 14 to FIG. 16, each of the samples of Examples 1 to 3 had the stress-neutral layer having a length of 0.01 mm or more, which was formed between the compressive stress layer and the tensile stress layer. The length of the compressive stress layer was longer than the length of the tensile stress layer. The tensile stress layer was located at a position 0.1 mm or more away from the first end surface. Further, the maximum value of the tensile stress in the tensile stress layer was 20 MPa or less. Thus, the occurrence of damage to the end portion of the capillary main body was remarkably low.

Meanwhile, as shown in Table 1 and illustrated in FIG. 17, the samples of Comparative Example did not have the stress-neutral layer between the compressive stress layer and the tensile stress layer. The maximum value of the tensile stress in the tensile stress layer exceeded 20 MPa. Further, the distance of the tensile stress layer from the first end surface was as short as 0.05 mm. Thus, the occurrence of damage to the end portion of the capillary main body was remarkably high.

The present invention is not limited to the configurations of the above-mentioned embodiments. In addition, the action and effect of the present invention are not limited to those described above. The present invention may be modified in various forms within the range not departing from the spirit of the present invention.

In the embodiment described above, there has been described an example in which the capillary main bodies 9 were heated one by one in the heating step S2. However, the present invention is not limited to the configuration described above. In the heating step S2, a plurality of capillary main bodies 9 may be bundled so that their first end surfaces 9*a* are aligned with each other, and the first end surfaces 9*a* and the opening portions 11 of the plurality of capillary main bodies 9 may be heated with the laser beam L.

In the embodiment, the capillary main body 9 comprising the stress-neutral layer NSL has been described. However, the present invention is not limited to the embodiment described above. The end portion (boundary portion between the tensile stress layer and the compressive stress layer CSL) of the tensile stress layer TSL may be set away from the first end surface 9*a* by setting the length dimension L3 of the compressive stress layer CSL longer than the length dimension L4 of the tensile stress layer TSL instead of providing the stress-neutral layer NSL. In this embodiment, the length dimension L3 of the compressive stress layer CSL is preferably 1.1 times to 4 times larger than the length dimension L4 of the tensile stress layer TSL, more preferably 1.2 times to 3 times larger, further preferably 2 times to 3 times larger. Further, the length dimension L3 of the compressive stress layer CSL may be set larger than the length dimension L4 of the tensile stress layer TSL in addition to the formation of the stress-neutral layer NSL.

In the embodiment, the capillary main body 9 comprising the stress-neutral layer NSL and the length dimension L3 of the compressive stress layer CSL were set longer than the length dimension L4 of the tensile stress layer TSL have been described. However, the present invention is not limited to the embodiments described above. The end portion (end portion on the first end surface 9*a* side) of the tensile stress layer TSL, which corresponds to the compressive stress layer CSL, may be set 0.1 mm or more away from the first end surface 9*a* in the capillary main body 9 regardless of the length dimension L3 of the compressive stress layer CSL. In this embodiment, the end portion of the tensile stress layer TSL is preferably 0.1 mm or more away from the first end surface 9*a*, more preferably 0.5 mm or more away, further preferably 1 mm or more away. Meanwhile, a distance between the first end surface 9*a* and the end portion of the tensile stress layer TSL is preferably 3 mm or shorter, more preferably 2 mm or shorter.

REFERENCE SIGNS LIST

2*a* first optical fiber
2*b* second optical fiber
2*c* third optical fiber
3*a* first capillary
3*b* second capillary
9 capillary main body
9*a* first end surface of capillary main body
9*b* second end surface of capillary main body
10 first accommodating portion of capillary main body
11 opening portion of capillary main body
11*a* inner wall surface of opening portion
12 through hole
13 adhesive
14 second accommodating portion of capillary main body
BD beam diameter of laser beam
CSL compressive stress layer
L laser beam
NSL stress-neutral layer
S1 preparation step
S2 heating step
S3 cooling step
TSL tensile stress layer
A1 direction in which laser beam travels
A2 direction in which laser beam travels

The invention claimed is:

1. A capillary for holding an optical fiber, the capillary comprising a capillary main body being made of glass and formed in an elongated shape,
wherein the capillary main body comprises:
an accommodating portion configured to accommodate a part of an optical fiber;
a first end surface formed at one end portion of the capillary main body in a longitudinal direction; and
a second end surface formed at another end portion of the capillary main body in the longitudinal direction,
wherein the accommodating portion comprises an opening portion, which is formed in the first end surface and is configured to allow insertion of the optical fiber, and
wherein the capillary main body comprises:
a compressive stress layer, which is formed on the opening portion and is observable by a two-dimensional birefringence measurement method;
a tensile stress layer, which is formed at a position away from the compressive stress layer toward the second end surface and is observable by the two-dimensional birefringence measurement method; and
a stress-neutral layer, which is formed between the compressive stress layer and the tensile stress layer and is observable by the two-dimensional birefringence measurement method.

2. A capillary for holding an optical fiber, the capillary comprising a capillary main body being made of glass and formed in an elongated shape,
wherein the capillary main body comprises:
an accommodating portion configured to accommodate a part of an optical fiber;
a first end surface formed at one end portion of the capillary main body in a longitudinal direction; and
a second end surface formed at another end portion of the capillary main body in the longitudinal direction,
wherein the accommodating portion comprises an opening portion, which is formed in the first end surface and is configured to allow insertion of the optical fiber, and
wherein the capillary main body comprises:
a compressive stress layer, which is formed on the opening portion and is observable by a two-dimensional birefringence measurement method; and
a tensile stress layer, which is formed at a position away from the compressive stress layer toward the second end surface and is observable by the two-dimensional birefringence measurement method, and wherein a length of the compressive stress layer in the longitudinal direction of the capillary main body is longer than a length of the tensile stress layer in the longitudinal direction of the capillary main body.

3. A capillary for holding an optical fiber, the capillary comprising a capillary main body being made of glass and formed in an elongated shape, wherein the capillary main body comprises:

an accommodating portion configured to accommodate a part of an optical fiber;

a first end surface formed at one end portion of the capillary main body in a longitudinal direction; and a second end surface formed at another end portion of the capillary main body in the longitudinal direction, wherein the accommodating portion comprises an opening portion, which is formed in the first end surface and is configured to allow insertion of the optical fiber, and wherein the capillary main body comprises:

a compressive stress layer, which is formed on the opening portion and is observable by a two-dimensional birefringence measurement method; and a tensile stress layer, which is formed at a position away from the compressive stress layer toward the second end surface and is observable by the two-dimensional birefringence measurement method, and wherein the tensile stress layer extends in the longitudinal direction from a position 0.1 mm or more away from the first end surface.

4. The capillary according to claim 1, wherein a maximum value of a tensile stress in the tensile stress layer, which is measured by the two-dimensional birefringence measurement method, is 20 MPa or smaller.

5. The capillary according to claim 1, wherein a length of the stress-neutral layer in the longitudinal direction of the capillary main body is 0.01 mm or longer.

6. The capillary according to claim 1, wherein the opening portion has an inner wall surface formed in a tapered shape.

7. The capillary according to claim 1, wherein the opening portion is filled with an adhesive.

8. A method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising:

a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, and wherein, in the heating step, the first end surface and the opening portion are heated to form a compressive stress layer observable by a two-dimensional birefringence measurement method on the opening portion, a tensile stress layer observable by the two-dimensional birefringence measurement method at a position away from the compressive stress layer toward the second end surface, and a stress-neutral layer observable by the two-dimensional birefringence measurement method between the compressive stress layer and the tensile stress layer.

9. A method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising:

a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, wherein, in the heating step, the first end surface and the opening portion are heated to form a compressive stress layer observable by a two-dimensional birefringence measurement method on the opening portion and a tensile stress layer observable by the two-dimensional birefringence measurement method at a position away from the compressive stress layer toward the second end surface, and wherein a length of the compressive stress layer in the longitudinal direction of the capillary main body is longer than a length of the tensile stress layer in the longitudinal direction of the capillary main body.

10. A method of manufacturing a capillary for holding an optical fiber, the capillary comprising a capillary main body being made of glass and formed in an elongated shape, the capillary main body comprising: an accommodating portion configured to accommodate a part of an optical fiber; a first end surface formed at one end portion of the capillary main body in a longitudinal direction; and a second end surface formed at another end portion of the capillary main body in the longitudinal direction, the accommodating portion comprising an opening portion, which is formed in the first end surface and is configured to allow insertion of the optical fiber, the method comprising:

a preparation step of preparing the capillary main body; and a heating step of heating the first end surface and the opening portion of the capillary main body, wherein, in the heating step, the first end surface and the opening portion are irradiated with a laser beam having a beam diameter larger than the first end surface, and wherein, in the heating step, the first end surface and the opening portion are heated to form a compressive stress layer observable by a two-dimensional birefringence measurement method on the opening portion, a tensile stress layer observable by the two-dimensional birefringence measurement method at a position away from the compressive stress layer toward the second end surface, and wherein the tensile stress layer extends in the longitudinal direction from a position 0.1 mm or more away from the first end surface.

11. The method of manufacturing a capillary according to claim 8, comprising a cooling step of cooling the first end surface and the opening portion at a cooling rate of 100° C./second or lower.

12. The method of manufacturing a capillary according to claim 8, wherein the laser beam is a $CO_2$ laser beam.

13. The capillary according to claim 2, wherein a maximum value of a tensile stress in the tensile stress layer, which is measured by the two-dimensional birefringence measurement method, is 20 MPa or smaller.

14. The capillary according to claim 2, wherein the opening portion has an inner wall surface formed in a tapered shape.

15. The capillary according to claim 2, wherein the opening portion is filled with an adhesive.

16. The capillary according to claim 3, wherein a maximum value of a tensile stress in the tensile stress layer, which is measured by the two-dimensional birefringence measurement method, is 20 MPa or smaller.

17. The capillary according to claim 3, wherein the opening portion has an inner wall surface formed in a tapered shape.

18. The capillary according to claim 3, wherein the opening portion is filled with an adhesive.

19. The method of manufacturing a capillary according to claim 9, comprising a cooling step of cooling the first end surface and the opening portion at a cooling rate of 100° C./second or lower.

20. The method of manufacturing a capillary according to claim 9, wherein the laser beam is a $CO_2$ laser beam.

* * * * *